July 28, 1959 T. K. KJELLMAN ET AL 2,897,304
HUMIDISTAT
Filed Nov. 13, 1958 2 Sheets-Sheet 1
FIG. 1.
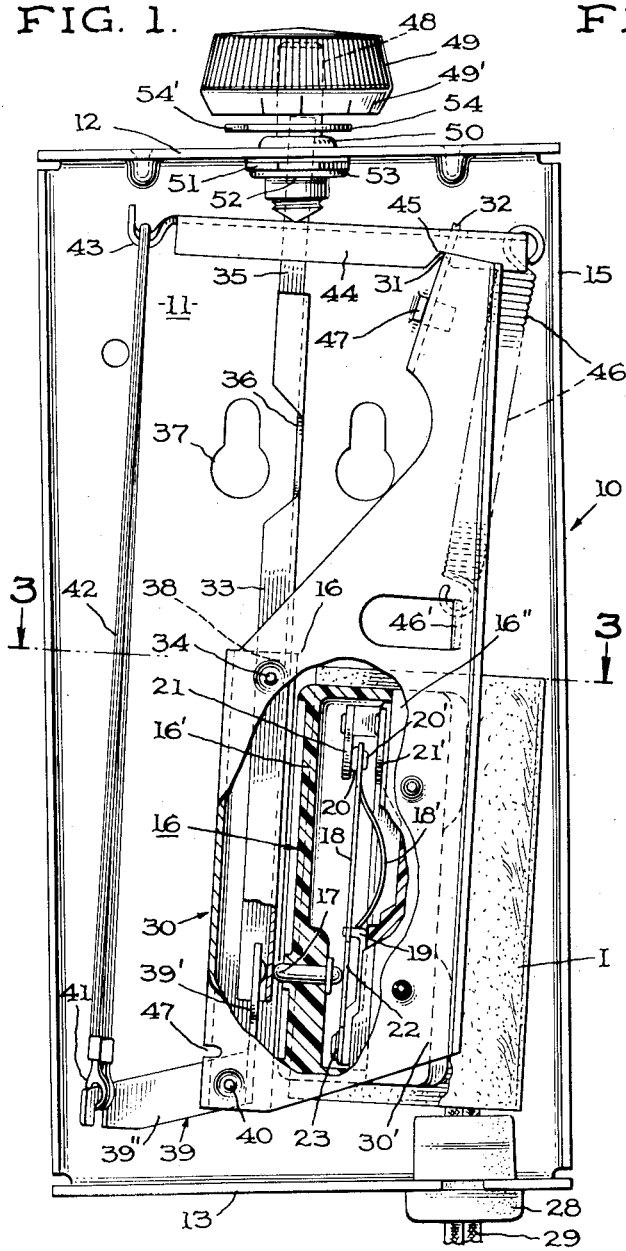
FIG. 2.
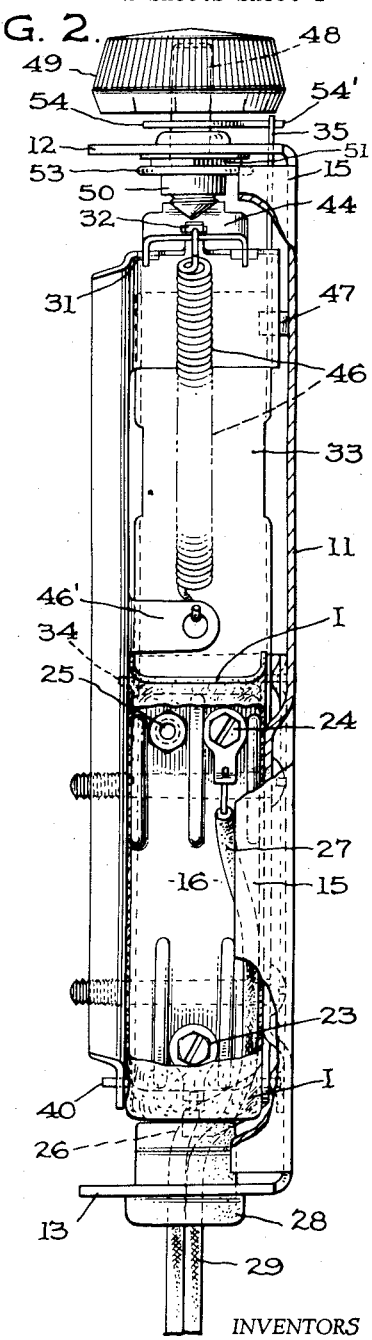
FIG. 4.
INVENTORS
THOMAS K. KJELLMAN
LOUVAN E. WOOD
BY K. G. Doub
ATTORNEY July 28, 1959  T. K. KJELLMAN ET AL  2,897,304
HUMIDISTAT
Filed Nov. 13, 1958  2 Sheets-Sheet 2
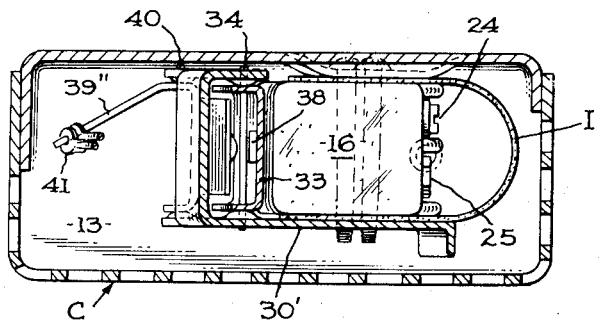
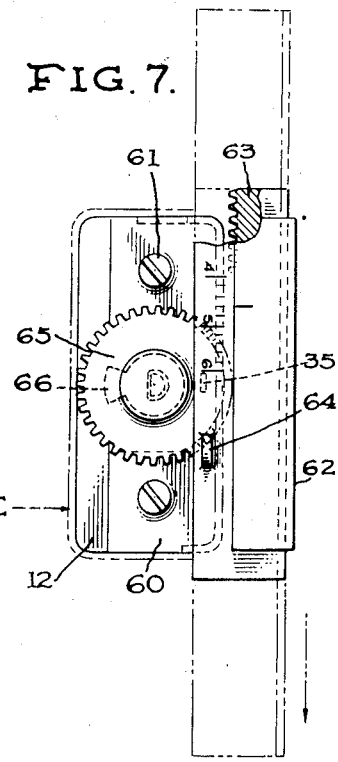
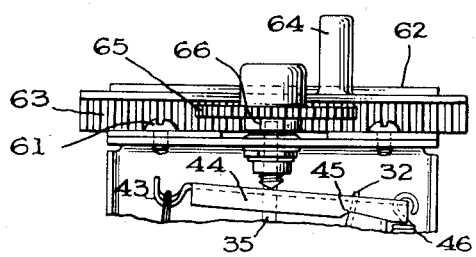
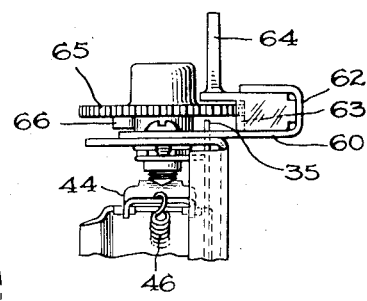
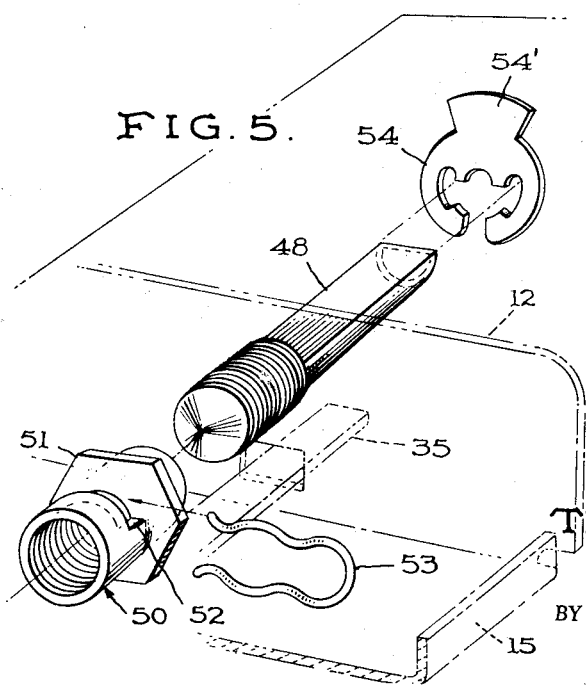
INVENTORS
THOMAS K. KJELLMAN
LOUVAN E. WOOD
BY K. G. Doub
ATTORNEY United States Patent Office 2,897,304
Patented July 28, 1959

2,897,304

HUMIDISTAT

Thomas K. Kjellman, Timonium, and Louvan E. Wood, Glen Arm, Md., assignors to Bendix Aviation Corporation, Baltimore, Md., a corporation of Delaware Application November 13, 1958, Serial No. 773,781

14 Claims. (Cl. 200—61.06)

The humidistat shown and described herein may be considered in the nature of an improvement over that of the Keenan Patent No. 2,780,687, assigned to the assignee of the present invention.

The public demand for humidistats capable of controlling an electric power circuit without requiring interconnected relays and like switch-control circuitry has increased to a point where low-cost mass production methods are imperative, while at the same time sensitivity in response to relatively small changes in humidity must be maintained. This requires extremely sensitive switch contacts with substantially no lost motion connections between the contact-actuating mechanism and the element which expands and contracts in response to variations in the moisture content of the air. The humidistat of the Keenan patent is a sensitive low-cost instrument, but that which forms the subject-matter of the present invention is also sensitive yet is simpler and still lower in production costs and in addition incorporates certain advantageous features, among which are the following:

Means whereby should the control knob or other hand-operated member be turned in a direction to tense the humidity-responsive element (which in the normally-closed type of switch circuitry is in a direction for increasing the relative humidity) and beyond the maximum relative humidity setting, it will come up against a positive "off" stop effective to cut a dehumidifier under control of the humidistat out of its electric power circuit, even though the humidity element should break when it is tensed under maximum-setting conditions. Should the control knob be rotated back from its "off" position to any setting within the calibrated range, the humidistat will regulate automatically if the humidity element is intact; if not, it will run continuously until again turned off manually.

Means whereby should the control knob or like control member be turned to and below the lowest calibrated relative humidity setting (which in the normally-closed type of switch circuitry is in a direction to reduce the tension of the humidity-responsive element) the control member will again come up against the said stop but in the opposite direction, whereupon the dehumidifier will remain on, subject to manual control. This accommodates installations where it may be necessary to have the air in an enclosure unusually dry on a part or full-time basis.

Means facilitating calibration of the humidistat.

A simple inbuilt anti-rattle arrangement which insures against annoyance due to vibration when the humidistat is mounted directly on the humidity-regulating machine, which may be a dehumidifier, humidifier or a combination of the two.

In the drawings:

Fig. 1 is a view in elevation of a humidity control device or humidistat in accordance with the invention, the cover thereof being removed and part of the switch unit housing being broken away and shown in section;

Fig. 2 is a view in edge elevation of Fig. 1, partly broken away;

Fig. 3 is a section taken on the line 3—3 of Fig. 1 plus the cover C;

Fig. 4 is a view in elevation of the control end (top as viewed in Figs. 1 and 2) of the humidistat, the control knob being shown in phantom outline;

Fig. 5 is a disassembled perspective of the manual setting and calibrating assembly; and Figs. 6, 7 and 8 are views in front side, front end and edge elevation, respectively, of a modified form of setting and calibrating assembly.

Referring to Figs. 1 to 5, inclusive, of the drawings, the working parts of the humidistat are supported by a mounting bracket, generally indicated at 10 (which if a cover is used forms the back half of a case for the humidistat), having a back wall 11, end walls 12 and 13, and side flanges 14 and 15.

The particular type of humidity control device or humidistat herein disclosed is adapted to be mounted directly on a dehumidifier; it utilizes a snap-action switch per se generally similar to the switch of the aforesaid Keenan patent. In the example adopted for the purposes of illustration, the switch is wired for a normally-closed circuit, causing the drive motor for the dehumidifier to run continuously until the surrounding air attains a preselected percentage of relative humidity or moisture content. This causes the humidity element (which in the present instance is composed of a plurality of strands of human hair) to tense, separating the switch contacts and breaking the motor power circuit. By a rearrangement of the circuitry in a manner obvious to those skilled in the art, the humidistat could be rendered operative to work in the reverse cycle, or it could be adapted to control apparatus effective to both humidify and dehumidify the air.

The switch proper comprises a relatively small compact unit generally indicated at 16, the working parts of which are encapsulated in a case of molded composition material made up of two parts 16' and 16''. The part 16' contains a plunger-type switch button 17 while the part 16'' contains a snap-action terminal-bridging leaf spring strip 18 having a bowed and stressed toggle spring tongue 18' which gives a toggle action to the spring strip 18, said tongue 18' being cut longitudinally out of the strip 18. The free end of the toggle spring tongue 18' projects towards the fixed end of the strip 18 and engages a fixed abutment 19. Contacts 20 and 20' are secured on opposite sides of the free portion of the strip 18 and are adapted to engage coacting terminal contacts 21 and 21'. The spring strip 18 is stamped out with a cross piece 22 which bears against the inner end of the plunger button 17 and urges the latter outwardly against a switch lever, to be described. The switch 16 has three external wiring terminals 23, 24 and 25. Terminal 23 connects the fixed end of strip 18 into the circuit, 24 connects the contact 21 into the circuit, and 25 serves to connect contact 21' into the circuit. When using a normally closed type circuit as illustrated herein, terminals 23 and 24 only are wired into the supply circuit by leads 26 and 27 and the terminal 25 remains "dead." The bowed spring toggle tongue 18' tends to snap the contact end of the spring strip 18 past dead center. In the present instance, the strip 18 is biased in a direction opposing depression of the plunger button 17, not only by the spring action of the strip itself but also by the toggle effect of the bowed tongue 18. Therefore, unless the pressure on said button is sufficient to overcome the toggle thrust of the spring tongue 18', contacts 20 and 21 will remain closed, as shown in Fig. 1. When the button is depressed, the spring strip 18 and toggle tongue 18' combine to resist contact separation until the pressure builds up to a predetermined value, whereupon the strip 18 snaps the contact 20' against 21'.

However, the spring strip 18 is then still biasing the plunger button to return position although the intermediate portion of said strip has been deflected past the dead-center line of thrust of the tongue 18', which contributes the toggle action to the throw of the switch. When the plunger button 17 is in its "out" position with contacts 20 and 21 in engagement, the spring strip 18 bridges the terminals 23 and 24. Lead wires 26 and 27 are brought out through a grommet 28 seated in the end plate 13 and merge to provide a power cord 29

The member indicated at I is a piece of insulation fabric to ensure against voltage breakdown between the switch and its adjacent supporting structure.

The entire switch-operating mechanism is assembled to a single one-piece mounting bracket, generally indicated at 30, having side flanges or walls 30' and 30", the wall 30' projecting forwardly in a gradually relieved portion and terminating in a knife edge 31, having a tongue 32 projecting therefrom. A manually operable switch lever is indicated at 33; it is in the form of an elongated channel-shaped piece of sheet metal having its side flanges pivoted at an intermediate point on a swivel pin 34, the latter at its opposite ends being anchored in the side walls of the bracket 30. At its inner end the switch lever 33 bears against the exposed end of the plunger button 17, while at its outer end the said lever is formed with a projection 35, the purpose of which will be subsequently described. The arcuately relieved portions 36 of the side flanges of the lever are to permit a limited amount of deformation should such become necessary to accurately locate the outer projecting end 35 during assembly and they also provide clearance for anchor screws, not shown, having heads adapted to project through key-shaped hanger slots 37.

At an intermediate point the lever 33 is provided with a spring tongue 38, which is cut out of the metal of the lever and bears against the pivot or swivel pin 34. This insures against rattling of the parts which might otherwise result from a loose swivel mounting of the lever and coacting parts.

An automatically-controlled switch lever is indicated at 39; it is formed with side lugs by means of which it is swiveled on a pin 40, projected through the side walls or flanges of the bracket 30. The lever 39 is generally in the form of a bell crank, one part 39' of which overlaps the contiguous end of the switch lever 33 and functions to depress switch button 17 when the lever is rocked in a clockwise direction, and the other part of which is in the form of an arm 39" terminating in a hook in which the terminals 41 for the free ends of a humidity element 42 engage, said element in the present instance being in the form of a multiple of strands of human hair which are clamped together at their free ends by the shanks of the terminals 42. At its opposite end the hair element is looped around a hook 43, formed on the end of a humidity element tensioning or adjusting lever 44. The lever 44 is here shown in the form of a piece of channel-shaped sheet metal having its side flanges notched or recessed at 45, by means of which the lever is fulcrumed on the knife edge 31, the tongue 32 projecting through an opening formed in the wall of the said lever 44, holding the latter against sidewise displacement. A spring 46 is connected at one end to a lug 46', punched out of the adjacent side wall of the bracket 30, and at its opposite end is connected to the contiguous end of the lever 44. Spring 46 normally biases the lever 44 in a clockwise direction as viewed in Fig. 1, tensioning the hair element 42 to a degree determined by the setting of said lever in a manner to be described. When the tension on the humidity element exceeds a predetermined or selected value, the button 17 will exert sufficient force on the spring strip 18 to snap contacts 20 and 21 to open position. Spring 46 should have sufficient strength to overcome the biasing force of spring strip 18 when the humidity element contracts beyond the set point of the humidistat but at the same time it should be weak enough to "give" before the humidity element breaks should the said element contract beyond the point where the switch button 17 bottoms-out after the strip 18 is snapped in a circuit-breaking direction. The switch levers 33 and 39, humidity element tensioning lever 44, humidity element 42, and spring 46 are all supported by the bracket 30 and together with the latter constitute a self-contained assembly. Bracket 30 may be quickly and easily connected to the backing plate 10, the latter having a boss 47 punched out of the metal thereof for locating the said bracket with respect to said plate.

The adjusting or setting assembly comprises a short shaft or screw 48, having an externally threaded inner pointed end and an outer D-shaped portion for mounting an adjusting knob 49, provided with suitable calibrations 49'. This shaft is journaled in an internally-threaded bushing 50, having a hex nut portion 51, adjacent which is a through slot 52. A spring wire friction key 53 straddles the bushing 50 and has one of its legs received in said slot to thereby impose sufficient resistance to turning as will maintain the said shaft in its preset or adjusted position.

An "on" and "off" control element 54, in the form of a thin metal washer having a radially-projecting cam sector 54', has a hole punched out of its central area in a manner such as to define a plurality of resilient shaft-engaging spurs 55, note particularly Figs. 4 and 5. By utilizing a shaft-receiving opening having this construction, the stop washer 54 can be forced onto the shaft manually with comparative ease while at the same time ensuring a snug fit yet permitting the washer to be easily slid outwardly to a point where the sector 54' clears the projection 35 should it become necessary to rotate shaft 48 more than one turn when calibrating the humidistat. This calibrating action can also be had by holding the screw or shaft 48 against rotation and rotating bushing 50 by applying a wrench to hex nut 51.

The projection 35 on the outer end of the lever 33 extends through an opening 56 in the end wall 12 into the path of the cam sector 54' formed on the thin metal washer 54, note Fig. 4. When the shaft 48 is rotated in a counterclockwise direction beyond the maximum humidity setting, the cam sector 54' engages the contiguous edge of the projection 35 and flexes the lever 33 in a direction to separate contact 20 from 21, breaking the circuit controlled by the humidistat; and when the said shaft is rotated in the opposite direction beyond the minimum humidity setting, the cam sector engages the opposite edge of the projection and flexes the lever 33 in a direction to permit contact 20 to snap against contact 21 and close the circuit controlled by the humidistat. The advantages of this arrangement will be more fully brought out in the description of operation, which follows:

Operation

As will be obvious to those having a layman's knowledge of the art, the hair strands which make up the humidity element or cable 42 will contract as the moisture content or the relative humidity of the air decreases and will expand when the relative humidity increases. As heretofore noted, the humidistat as shown herein is adapted to control a dehumidifier; it will cause the dehumidifier to run and extract moisture from the air as long as the relative humidity is above a predetermined or selected value. When the relative humidity drops below such value, the machine will stop and will remain so until the relative humidity again increases above the preset value. If sufficient pressure is applied in a clockwise direction to the upper or outer extremity of the switch lever 33 beyond its pivotal pin 34 as viewed in Fig. 1, the pressure of the lower or inner end of said lever on the switch button 17 will be overcome by the force of the spring strip 18 and the latter will snap in a direction to move contact 20 against contact 21, closing the dehumidifier drive circuit, not shown; counterclockwise pressure on the upper end of lever 33 causing the inner end of said lever to depress said button, whereupon the spring strip 18 will snap in a direction to move contact 20 clear of 21 and open said circuit. Counterclockwise and clockwise pressure is applied on the outer end of lever 30 only when the cam sector 54' on washer 54 is rotated beyond maximum and minimum relative humidity settings. If the bell crank arm 39" of switch lever 39 is rotated in a clockwise direction a certain distance, as by contraction of the humidity element 42, the said lever will reposition the switch button 17 through the interposed inner or lower end of the switch lever 33 in a circuit-breaking direction (press the button 17 inwardly), and if said arm is rotated counterclockwise, the switch button is repositioned in a circuit-closing direction by the spring strip 18. The degree of travel and force required to throw spring strip 18 are constant factors, hence the degree of rotation imparted to bellcrank switch lever 39 permitted by contraction and expansion of the humidity element 42 is the only variable to be determined by adjustment of lever 44.

As heretofore noted, the force of the spring 46 pulling on the fulcrum lever 44 is greater than the force required to snap the spring strip 18 of the switch unit 16 to circuit-break position. Hence, once the position of lever 44 is set by adjustment of the shaft 48, any contraction of the humidity element 42 will act only on the lever 39.

In the position of the parts as shown in Fig. 1, it will be assumed that the adjustment is such that the humidity element 42 is just slack enough to permit the switch contacts 20 and 21 to remain in engagement, closing the circuit to the dehumidifier drive motor, not shown, so that the machine is running and extracting moisture from the air. Should now the relative humidity decrease below the setting of the humidistat, the hair element 42 will contract and urge the switch lever 39 in a clockwise direction until the spring strip 18 snaps the contacts 20 and 21 to open position, breaking the circuit to the drive motor of the dehumidifier. Should the moisture content of the air increase to a point above the relative humidity setting, the reverse action takes place, i.e. the strands of hair which make up the humidity element or cable 42 will become increasingly slack until the lever 39 relieves its pressure on the switch button 17, whereupon the switch button is urged outwardly by the spring strip 18 until the latter again snaps in the opposite direction and contact 20 engages contact 21, closing the circuit to the said drive motor.

To increase the relative humidity setting of the humidistat, the control knob 49 and consequently the shaft 48 is turned in a counterclockwise direction (facing the end wall 12, Fig. 4), thereby backing off the inner threaded end of said shaft from the channel-shaped lever 44. The force of spring 46 will then be applied by way of the hair element 42 and bell crank lever 39 on the plunger button 17 and reposition the latter inwardly. This assumes, of course, that the hair element is at this time taut; if not, the plunger button will not be affected until the humidity decreases to a point where the slack in the humidity element is taken up.

If the shaft 48 is rotated in a counterclockwise direction beyond the maximum relative humidity setting, the cam sector 54' on the washer 54 engages the contiguous edge of the projection 35 on the outer end of the lever 33 and depresses the latter to a point where the switch button 17 causes the spring strip 18 to snap the contacts 20 and 21 to open position. Since the frictional resistance to turning of the shaft 48 provided by the key 53 is sufficient to withstand the reverse torque force of the lever 33, the circuit to the drive motor of the dehumidifier will remain broken. If the hair-strand humidity element remains intact, control of the supply circuit will be automatic or normal when the shaft 48 is rotated back within the calibrated range of the humidistat. However, should the hair element be broken, the dehumidifier will be under manual control to the extent that it can be turned off in the manner above noted, and it can also be turned on by rotating the shaft 48 in a clockwise direction until the cam segment or sector 54' relieves its pressure on the lever 33, whereupon the latter in turn relieves its pressure on button 17, permitting spring strip 18 to close the contacts 20 and 21.

During normal operation of the humidistat with the humidity element intact, there is usually a minimum and maximum calibrated range of adjustable control. Thus the upper limit of the range may be 80% relative humidity and the lower limit 20%. In certain installations, there may be occasions when it is desired to maintain the air in a space or area at a humidity below 20%. To accommodate such installations, if the shaft 48 is rotated in a clockwise direction to a point where the cam segment 54' on the washer 54 engages the opposite edge of the projection 35 on the outer end of the lever 33 and flexes the latter sufficiently in a clockwise direction, the contacts 20 and 21 will close and remain closed and the dehumidifier will run continuously until the shaft 48 is rotated back within the calibrated range.

Another advantage of having a manual control as above described is that should the humidistat go out of calibration while in use, an attendant can turn the dehumidifier on and off at will.

The projecting end 35 of lever 33, when brought up against either side of slot 56 by cam segment 54' also functions as a positive stop; it limits rotation of shaft 48 to within one revolution covering the entire calibration scale plus "on" and "off."

The arrangement of the spring 46 in relation to the leverage system has an important advantage in that a coil spring of proper strength can be selected to avoid damage to the sensitive humidity element. Certain types of humidistats use control elements which when adjusted to a certain point, exert so much pressure on the humidity element as to place undue stress on the latter.

Should the humidistat be used to control a machine which operates to humidify the air in an enclosure, then the terminals 23 and 25 would be wired for "normally open" operation. Should then the moisture content of the air decrease beyond a predetermined value, the humidity element 42 would slacken and cause the contacts 20' and 21' to engage. Should both humidifier and dehumidifier apparatus be under control of the humidistat, contacts 21 and 21' would both be wired into the circuit.

An important factor tending to reduce manufacturing costs of the humidistat is the manner in which the parts engage and coact to provide an efficient operating device with a minimum number of parts capable of being readily assembled. Thus the switch unit 16 may be manufactured as a separate entity and along with the switch levers 33, 39, adjusting lever 44 and associated parts, may be assembled to the bracket 30 and the latter then quickly and easily secured to the mounting plate or bracket 10. Should it be necessary to slightly reposition the outer end of lever 35 in its slot 56, the said lever may be slightly bent or deformed in the area of the cut-out portions 36.

It is a simple procedure to calibrate the instrument originally by coordinating the position of the shaft 48 with that of lever 44, and also during the life of the instrument should the humidity element or associated parts go through changes which tend to throw the humidistat out of calibration.

*Figs. 6, 7 and 8*

In some installations it is of advantage to substitute the conventional control knob or rotary adjusting and setting member with a linear type such as shown in Figs. 6, 7 and 8. This linearly adjustable drive assembly comprises an end plate 60, which is secured to the end wall 12 by means of screws 61. The outer or free edge portion of the plate is shaped to provide a guideway 62, in which a toothed rack 63 is slidingly mounted and is provided with a finger grip or knob 64. A spur gear 65, driven by the rack 63, replaces the knob 49 on the outer end of the shaft 48; it has a stop lug 66 projecting from the inner hub portion thereof adapted to engage the outer end 35 of the lever 33 where it projects through the opening 56 in the end plate 12 and control said lever in the same manner as results from the use of the cam washer 54 with its cam sector 54', heretofore described.

What we claim is:

1. A humidistat comprising a mounting bracket, a rotatable adjusting member having a threaded mounting in a wall of said bracket and terminating in a free abutment end inwardly of said wall, an electric switch unit having a resilient contact member adapted to move to circuit make-and-break positions, said contact member requiring an external force to actuate it to one of said positions and being spring-biased to the other of said positions, a push-button type plunger for actuating said contact member against its biasing force, a switch lever of generally bell-crank shape having an arm adapted to depress said plunger button and a lever arm projecting free, an adjusting lever movably supported adjacent the inner abutment end of said adjusting member, a spring biasing the adjusting lever toward the abutment end of said adjusting member, one end of said adjusting lever projecting free in spaced relation to the free arm of said bell crank lever, and a humidity element consisting of a length of humidity-responsive material connected to the free arm of said bell crank lever and the free end of said adjusting lever, the biasing force of said spring acting on said adjusting lever being greater than the biasing force of said contact member acting on said bell crank switch lever through said push button plunger.

2. A humidistat comprising a mounting bracket, a rotatable adjusting member having a threaded mounting in a wall of said bracket and terminating in a free abutment end inwardly of said wall, an electric switch unit having a resilient contact member adapted to move to circuit make-and-break positions, said contact member requiring an external force to move it to one of said positions and being spring-biased to the other of said positions, a push button type plunger adapted to actuate said contact member to one of said positions against its biasing force, a first switch lever adapted to depress said plunger and having a lever arm projecting free, an adjusting lever movably supported adjacent the inner abutment end of said adjusting member, a spring biasing said adjusting lever toward the abutment end of said adjusting member, the one end of said adjusting lever projecting free in spaced relation to the free arm of said first switch lever, a humidity element consisting of a length of humidity-responsive material connected to the free arm of said switch lever and the free end of said adjusting lever, a second switch lever arranged to depress said push button plunger independently of said first switch lever, and means adapted to actuate said second switch lever through rotation of said adjusting member and thereby manually control the position of said push button plunger independently of the automatic control afforded through response to changes in relative humidity of said humidity element.

3. A humidistat comprising a mounting bracket, a rotatable adjusting member having a threaded mounting in a wall of said bracket and terminating in a free abutment end inwardly of said wall, an electric switch unit having a resilient contact member adapted to move to circuit make-and-break positions, said contact member requiring an external force to move it to one of said positions and being spring-biased to the other of said positions, a push button type plunger adapted to actuate said contact member to one of said positions against its biasing force, a first switch lever of generally bell-crank shape having an arm adapted to depress said plunger button and a lever arm projecting free, an adjusting lever movably supported adjacent the inner abutment end of said adjusting member, a spring biasing said adjusting lever toward the abutment end of said adjusting member, the one end of said adjusting lever projecting free in spaced relation to the free arm of said first switch lever, a humidity element consisting of a length of humidity-responsive material connected to the free arm of said first switch lever and the free end of said adjusting lever, a second switch lever fulcrumed at an intermediate point and having its inner extremity adapted to engage and actuate said push button plunger independently of said first switch lever and its outer extremity terminating in the region of said adjusting member, and means rotatable with said adjusting member adapted to engage and actuate said second-named lever for manually controlling the position of said push button plunger independently of the automatic control afforded through response to changes in relative humidity of said humidity element.

4. A humidistat as claimed in claim 3 wherein said means rotatable with said adjusting member is provided with a radially-projecting cam sector adapted to engage the adjacent end of said second switch lever when the adjusting member is rotated to an extreme position in a direction to stress said humidity element.

5. A humidistat including a humidity element in the form of a length of humidity-responsive material, an electric switch unit having a resilient contact member adapted to move to circuit make-and-break positions; means for actuating said contact member comprising an actuating lever having an arm projecting free and an adjusting lever having a free end spaced from said arm with said humidity element connected between said arm and free end of said adjusting lever; an adjusting member for manually positioning said adjusting lever to adjust the tension of said humidity element, a second lever arranged to actuate said contact member independently of said first-named actuating lever, and means for manually controlling said second lever.

6. A humidistat including a humidity element in the form of a length of humidity-responsive material, an electric switch unit having a resilient contact member movable to circuit make-and-break positions, a first switch lever arranged to actuate said contact member and having an arm projecting free, an adjusting lever having a free end spaced from said arm, said humidity element being connected between said arm and the free end of said lever, a spring biasing said adjusting lever in a direction to tension said humidity element, a rotatable adjusting member having a free end adapted to reset said adjusting lever, a second switch lever having its inner end arranged to actuate said contact member and an outer end located adjacent said adjusting member, and means rotatable with said adjusting member adapted to engage the outer end of said second lever when said adjusting member is rotated to either one of its extreme positions and actuate said contact member independently of said first-named switch lever.

7. A humidistat as claimed in claim 6 wherein said second switch lever is fulcrumed at an intermediate point on a shaft and is formed of sheet metal provided with a resilient tongue adapted to bear against the shaft and ensure against a loose mounting of said lever.

8. A humidistat as claimed in claim 6 wherein the means rotatable with said adjusting member comprise a cam-shaped sector which engages the outer end of said second switch lever when said member is rotated to either one of its extreme positions beyond the calibrated range of the humidistat.

9. A humidistat as claimed in claim 6 wherein the outer end of said second switch lever, in addition to its switch-actuating function, is arranged to act as a stop for positively limiting said adjusting member to within one revolution.

10. A humidistat including a humidity element in the form of a length of humidity-responsive material, an electric switch unit having a resilient contact member adapted to move to circuit make-and-break positions, said contact member requiring an external force to move it to one of said positions and being spring-biased to the other of said positions, a push button type plunger for moving said contact member against its biasing force, a first switch lever having a portion adapted to depress said plunger button and an arm projecting free, an adjusting lever having a free end located in spaced relation to said arm, said humidity element being connected between said arm and the free end of said lever, a spring biasing said adjusting lever in a direction to tension said humidity element, rotatable adjusting means including a short shaft having its inner end arranged to abut said adjusting lever to determine the degree of tensioning of said humidity element, a second manually-operable switch lever having one end located to control said push button independently of said first switch lever and its opposite end located adjacent said shaft, and a cam sector arranged to rotate with said shaft and engage the adjacent end of said manually-operable lever and actuate the latter when the shaft is rotated to either one of its extreme positions beyond the calibrated range of the humidistat.

11. A humidistat as claimed in claim 10 wherein said shaft is threaded through a bushing having a through-slot therein and there is a resilient member having a spring leg inserted in said slot in engagement with said shaft to provide frictional resistance to turning of the shaft so that the shaft will remain in either one of its extreme positions against the biasing force of said switch contact element acting on said second-named lever.

12. A humidistat as claimed in claim 10 wherein said cam sector is formed on a washer having spurs which project radially inwardly around the shaft opening and frictionally engage said shaft while at the same time permitting the washer to be readily shifted longitudinally of the shaft.

13. A humidistat comprising a main elongated mounting bracket having an end wall, a rotatable adjusting shaft having a threaded mounting in said end wall and terminating in a free abutment end inwardly of the wall, an electric switch unit having a spring contact strip adapted to snap to circuit make-and-break positions, said strip requiring an external force to move it to one of said positions and being spring-biased to the other of said positions, a push button type plunger for actuating said strip to one of said positions against its biasing force, a second bracket detachably connected to said first-named bracket, said switch unit being secured to said second bracket, a first switch lever of generally bell-crank shape pivotally mounted on said second bracket and having a member arranged to depress said plunger button and an arm projecting free, said second bracket having a forwardly projecting portion terminating in a knife edge, an adjusting lever fulcrumed on said knife edge adjacent the abutment end of said adjusting member, a spring connected to one end of said adjusting lever beyond its fulcrum point biasing said lever against the abutment end of said adjusting member, the opposite end of said adjusting lever projecting free in spaced relation to the free arm of said first switch lever, a humidity element consisting of a length of humidity-responsive material connected to the free arm of said first switch lever and the free end of said adjusting lever, a second switch lever fulcrumed at an intermediate point on said second bracket and having an inner end arranged to depress said push button and an outer end projecting through a slot formed in said end wall, and a cam sector secured on said shaft and adapted to engage the outer end of said second switch lever when the shaft its rotated to either one of its extreme positions beyond the calibrated range of the humidistat and actuate said latter lever to "on" and "off" positions.

14. A humidistat including a humidity element in the form of a length of humidity-responsive material, an electric switch unit having a contact member movable to circuit make-and-break positions, a first switch lever arranged to actuate said contact member and having an arm projecting free, an adjusting lever spaced from said arm, said humidity element being connected between said arm and said lever, a spring biasing said adjusting lever in a direction to tension said humidity element, a rotatable adjusting shaft for resetting said adjusting lever, a second switch lever having its inner end arranged to actuate said contact member and its outer end located adjacent said adjusting shaft, a spur gear secured on said shaft, a manually adjustable slide rack having teeth in mesh with said gear, and a member rotatable with said gear adapted to engage the outer end of said second lever when said shaft is rotated to either one of its extreme positions and actuate said contact member independently of said first-named switch lever.

No references cited.

UNITED STATES PATENT OFFICE
CERTIFICATE OF CORRECTION

Patent No. 2,897,304                                                 July 28, 1959

Thomas K. Kjellman et al.

It is hereby certified that error appears in the printed specification of the above numbered patent requiring correction and that the said Letters Patent should read as corrected below.

Column 2, line 48, after "free" insert -- end --; column 5, line 7, for "lever 30" read -- lever 33 --.

Signed and sealed this 15th day of September 1959.

(SEAL)
Attest:

KARL H. AXLINE
Attesting Officer

ROBERT C. WATSON
Commissioner of Patents

Notice of Adverse Decision in Interference

In Interference No. 90,938 involving Patent No. 2,897,304, T. K. Kjellman and L. E. Wood, Humidistat, final judgment adverse to the patentees was rendered Mar. 4, 1963, as to claims 3, 4 and 5.

[*Official Gazette April 30, 1963.*]